United States Patent
Higashiyama et al.

(10) Patent No.: US 6,284,409 B1
(45) Date of Patent: Sep. 4, 2001

(54) PASTED HYDROGEN-ABSORBING ALLOY ELECTRODE FOR ALKALINE STORAGE BATTERY

(75) Inventors: Nobuyuki Higashiyama, Mino; Kikuko Kato, Katano; Teruhiko Imoto; Masutaka Ouchi, both of Tokushima; Mamoru Kimoto, Hirakata; Yasuhiko Itoh, Yawata; Koji Nishio, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/436,036

(22) Filed: Nov. 8, 1999

(30) Foreign Application Priority Data

Nov. 20, 1998 (JP) .................................... 10-347900

(51) Int. Cl.$^7$ ........................................ H01M 4/58
(52) U.S. Cl. ................................ 429/218.2; 429/218.1; 429/223; 429/206; 429/232; 420/900
(58) Field of Search .............................. 429/218.2, 226, 429/223, 218.1, 206, 232; 420/900

(56) References Cited

U.S. PATENT DOCUMENTS 5,738,953 * 4/1998 Lichtenberg et al. ................ 429/59
6,030,725 * 2/2000 Moriwaki et al. ................ 429/218.2

FOREIGN PATENT DOCUMENTS

| 361181063A | * | 8/1986 | (JP) | ............................ H01M/4/38 |
| 5-307952 | * | 11/1993 | (JP) . | |
| 6-215765 | * | 8/1994 | (JP) . | |
| 8-222210 | * | 8/1996 | (JP) . | |

* cited by examiner

Primary Examiner—Carol Chaney
Assistant Examiner—Angela J. Martin
(74) Attorney, Agent, or Firm—Kubovcik & Kubovcik

(57) ABSTRACT

In a pasted hydrogen-absorbing alloy electrode of this invention, an active material layer made from a mixture of a hydrogen-absorbing alloy powder, a composite particle powder including carbon particles and a rare earth compound for partially coating surfaces of the carbon particles, and a binder is formed on a current collector. When this pasted hydrogen-absorbing alloy electrode is used in an alkaline storage battery, the alkaline storage battery can attain small increase of the internal pressure during charge, large discharge capacity in high rate discharge and good charge-discharge cycle performance.

7 Claims, No Drawings

PASTED HYDROGEN-ABSORBING ALLOY ELECTRODE FOR ALKALINE STORAGE BATTERY

BACKGROUND OF THE INVENTION

This application claims the priority of Japanese Patent Application No. 10-347900/1998 filed on Nov. 20, 1998, which is incorporated herein by reference.

The present invention relates to a pasted hydrogen-absorbing alloy electrode for an alkaline storage battery comprising an active material layer formed on a current collector from a mixture including a hydrogen-absorbing alloy powder, a conductive agent and a binder.

An alkaline storage battery using a hydrogen-absorbing alloy electrode as a negative electrode has been recently regarded promising because of its higher energy density as compared with that of a conventional alkaline storage battery using a cadmium electrode or a zinc electrode as a negative electrode.

A pasted hydrogen-absorbing alloy electrode, which is a kind of the hydrogen-absorbing alloy electrode, is fabricated by applying a paste, obtained by mixing a hydrogen-absorbing alloy powder and a binder solution, on a current collector and drying the paste. In the pasted hydrogen-absorbing alloy electrode, electric contact among hydrogen-absorbing particles becomes defective with ease, resulting in lowering the conducting property. When the conducting property is lowered, the proportion of the hydrogen-absorbing alloy particles not involved in absorption and desorption of hydrogen (namely, charge and discharge) is increased, which can cause, in a battery using this electrode, decrease of the discharge capacity, degradation of the charge-discharge cycle performance and increase of the internal pressure during charge.

Accordingly, a carbon powder is generally included as a conductive agent in a pasted hydrogen-absorbing alloy electrode for improving the conducting property, and a technique to improve dispersibility of a carbon powder in a paste has been proposed (Japanese Laid-Open Patent Publication No. 5-307952/1993).

The oxygen absorbing power, however, cannot be sufficiently increased merely by improving the conducting property by adding a carbon powder. Therefore, the degradation of the charge-discharge cycle performance and the increase of the internal pressure derived from degradation through oxidation of the hydrogen-absorbing alloy cannot be sufficiently suppressed by this method. The improvement in the conducting property alone is not adequate for sufficiently increasing the oxygen absorbing power but oxygen should be easily adsorbed onto the surface of the hydrogen-absorbing alloy.

Furthermore, it has been recently reported that a composing element of a hydrogen-absorbing alloy can be prevented from eluting into an alkaline electrolyte by adding an oxide or a hydroxide of lanthanoid in the hydrogen-absorbing alloy or the alkaline electrolyte, resulting in improving the charge-discharge cycle performance and the storage characteristic (Japanese Laid-Open Patent Publication No. 8-222210/1996).

The oxygen absorbing power, however, cannot be sufficiently increased merely by adding an oxide or a hydroxide of lanthanoid. Therefore, the degradation of the charge-discharge cycle performance and the increase of the internal pressure derived from degradation through oxidation of the hydrogen-absorbing alloy cannot be sufficiently suppressed by this method. This is because an oxide or a hydroxide of lanthanoid does not have a function to improve the conducting property. On the contrary, the conducting property of the hydrogen-absorbing alloy particles can be degraded by singly adding an oxide or a hydroxide of lanthanoid with no conducting property, resulting in lowering the discharge capacity, in particular, in high rate discharge.

The present invention was devised in view of the aforementioned conventional problems, and an object of the invention is providing a pasted hydrogen-absorbing alloy electrode for attaining an alkaline storage battery with small increase of the internal pressure during charge, large discharge capacity in high rate discharge, and good charge-discharge cycle performance.

SUMMARY OF THE INVENTION

The pasted hydrogen-absorbing alloy electrode present electrode) for an alkaline storage battery of this invention comprises an active material layer formed on a current collector from a mixture including a hydrogen-absorbing alloy powder, a composite particle powder, serving as a conductive agent, made from carbon particles and a rare earth compound for partially coating surfaces of the carbon particles, and a binder.

Thus, the invention provides a pasted hydrogen-absorbing alloy electrode for attaining an alkaline storage battery with small increase of the internal pressure, large discharge capacity in high rate discharge and good charge-discharge cycle performance.

DETAILED DESCRIPTION OF THE INVENTION

An example of the hydrogen-absorbing alloy powder is a powder of a hydrogen-absorbing alloy having a $CaCu_5$ crystal structure represented by a composition formula, $MmNi_xCo_yM_z$, in which Mm is a Mischmetal (a mixture of rare earth elements); M is at least one element selected from the group consisting of Al, Mg, Mn, Fe, Sn, Si, W, Zn, Cr and Cu; $2.8 \leq x \leq 4.4$; $0 \leq y \leq 0.6$; $0 \leq z \leq 1.5$; and $4.5 \leq x+y+z \leq 5.6$. The hydrogen absorbing alloy in which $5.1 \leq x+y+z \leq 5.4$ is preferred. When x+y+z is smaller than 4.5, the oxygen absorbing power is so insufficient that the internal pressure can be easily increased during charge. On the other hand, when x+y+z is larger than 5.6, the discharge capacity in high rate discharge is decreased. This is probably because the hydrogen absorbing power of the hydrogen-absorbing alloy is lowered.

The hydrogen-absorbing alloy powder preferably includes spherical or hen's egg-shaped particles prepared by an atomizing method in a ratio of 10 wt % or more in order to obtain a pasted hydrogen-absorbing alloy electrode to give an alkaline storage battery with small increase of the internal pressure during charge, large discharge capacity in high rate discharge and good charge-discharge cycle performance. As the ratio of the spherical or hen's egg-shaped particles prepared by the atomizing method is larger, the dispersibility of the composite particles in hydrogen-absorbing alloy particles and the contact property between the hydrogen-absorbing alloy particles and the composite particles are more improved.

Examples of the material for the carbon particles are graphite, coke, carbon black and acetylene black. Examples of the rare earth compound for partially coating the surfaces of the carbon particles are an oxide, a hydroxide and a fluoride of yttrium, lanthanum, cerium, praseodymium, neodymium, samarium, europium, gadolinium, terbium, dysprosium, holmium, erbium, ytterbium or lutetium.

The mixing ratio between the hydrogen-absorbing alloy powder and the composite particle powder is preferably 100:0.1 through 100:10 on the basis of a weight ratio between the hydrogen-absorbing alloy and carbon. When the ratio of the composite particle powder is too small, it is difficult to sufficiently suppress the increase of the internal pressure during charge. On the other hand, when the ratio is too large, the packing amount of the hydrogen-absorbing alloy powder is so decreased that the capacity of the hydrogen-absorbing alloy electrode is decreased. The composite particle powder preferably has a rare earth element ratio R, defined in accordance with a formula below, of 10 wt % or less. When the rare earth element ratio R exceeds 10 wt %, the internal pressure can be increased during charge and the discharge capacity can be decreased.

Rare earth element ratio $R$ (wt %)=Amount of rare earth element/
(Amount of carbon+Amount of rare earth element)×100

In the present electrode, the carbon particle serving as a base of the composite particle has a function to improve the conducting property, and the rare earth compound serving as a coating layer of the composite particle has a function to accelerate adsorption of oxygen onto the surface of the hydrogen-absorbing alloy particle. Therefore, since the present electrode thus comprises the hydrogen-absorbing alloy powder containing the composite particle powder integrally including carbon and the rare earth compound, oxygen can be more efficiently reduced (absorbed) as compared with in an electrode containing a hydrogen-absorbing alloy powder separately including carbon and a rare earth compound. This is for the following reason: In the present electrode, both the conducting property necessary for an oxygen absorption reaction and the oxygen adsorbing property are improved in contact portions between the hydrogen-absorbing alloy particles and the composite particles. On the contrary, in the electrode separately including carbon and the rare earth compound, either the conducting property or the oxygen adsorbing property alone is improved due to contact between the hydrogen-absorbing alloy particles and either carbon or the rare earth compound. Accordingly, when the present electrode is used as a negative electrode of an alkaline storage battery, the degradation of the charge-discharge cycle performance and the increase of the internal pressure during charge derived from the degradation through oxidation of the hydrogen-absorbing alloy can be suppressed. Moreover, the rare earth compound further has a function to protect the surface of the hydrogen-absorbing alloy particle from an alkaline electrolyte, and hence, a composing element of the hydrogen-absorbing alloy can be suppressed from eluting into the alkaline electrolyte. As a result, in the present electrode, the degradation of the charge-discharge cycle performance derived from the elution of a composing element of the hydrogen-absorbing alloy is also suppressed.

Other features of the invention will become more apparent in the course of the following descriptions of exemplary embodiments which are given for illustration of the invention and not intended to be limiting thereof.

Embodiments

Experiment 1

Present electrodes and comparative electrodes were prepared so as to fabricate various alkaline storage batteries using these electrodes, and the internal pressure characteristics during charge, the discharge capacity in high rate discharge and the charge-discharge cycle performance of the batteries were examined.

Alkaline Storage Batteries A1 through A14

Preparation of Hydrogen-Absorbing Alloy Powder

An alloy material was melted through heating in an arc blast furnace in an argon atmosphere, and the melted alloy material was cooled by a single roll method, thereby preparing a hydrogen-absorbing alloy piece. The hydrogen-absorbing alloy piece was crushed into a hydrogen-absorbing alloy powder having n average particle size of 40 $\mu$m and represented by a composition formula $MmNi_{4.0}Co_{0.2}Al_{0.3}Mn_{0.5}$.

Preparation of Composite Particle Powder

In hydrochloric acid with pH 1.0, 25.4 g of yttrium oxide, 23.5 g of lanthanum oxide, 23.4 g of cerium oxide, 23.4 g of praseodymium oxide, 23.3 g of neodymium oxide, 23.2 g of samarium oxide, 23.2 g of europium oxide, 23.1 g of gadolinium oxide, 23.0 g of terbium oxide, 23.0 g of dysprosium oxide, 22.9 g of holmium oxide, 22.9 g of erbium oxide, 22.8 g of ytterbium oxide or 22.7 g of lutetium oxide was dissolved, and the resultant solution was adjusted to pH 6 by adding an aqueous solution of ammonia. The resultant solution was added to a suspension obtained by adding 200 g of a graphite powder (artificial graphite manufactured by Alusuisse Lonza Group Ltd.; product code: KS-15) to 300 ml of distilled water. An aqueous solution of ammonia was added dropwise to the resultant solution with stirring until pH 9 or more was attained, so as to deposit a hydroxide of the rare earth element on the particle surfaces of the graphite powder, and the resultant was filtered, washed with water and dried. Thus, fourteen kinds of powders were prepared. Each of the powders was analyzed by emission spectrochemical analysis, scanning electron microscopic analysis, electron probe microanalysis and X-ray diffraction analysis. As a result, each powder was found to be a composite particle powder with a rare earth element ratio R of 5 wt % in which the surfaces of the graphite particles were partially coated with the hydroxide of the rare earth element.

Preparation of Pasted Hydrogen-Absorbing Alloy Electrodes

The hydrogen-absorbing alloy powder and each of the composite particle powders prepared as above were mixed in a ratio by weight between the hydrogen-absorbing alloy and graphite of 100:0.1. To the resultant mixture, a 0.5 wt % poly(ethylene oxide) aqueous solution serving as a binder was added in a ratio of 10 wt %, thereby preparing a paste. The paste was applied on a punching metal (serving as a current collector) and dried. Thus, fourteen kinds of pasted hydrogen-absorbing alloy electrodes (present electrodes) were prepared.

Fabrication of Alkaline Storage Batteries

AA size sealed alkaline storage batteries A1 through A14 (each with theoretical capacity of 1000 mAh) were fabricated by using each of the pasted hydrogen-absorbing alloy electrodes (negative electrodes), a known sintered nickel electrode using nickel hydroxide as an active material (positive electrode) and an alkaline electrolyte (30 wt % potassium hydroxide aqueous solution). In each of these batteries, the capacity of the positive electrode was set smaller than the capacity of the negative electrode, so as to control the capacity of the battery in accordance with the capacity of the positive electrode.

Alkaline Storage Battery X1

The hydrogen-absorbing alloy powder (the same as that used in the alkaline storage batteries A1 through A14) and graphite (KS-15) were mixed in a ratio by weight between the hydrogen-absorbing alloy and graphite of 100:0.1. To the resultant mixture, a 0.5 wt % poly(ethylene oxide) aqueous solution serving as a binder was added in a ratio of 10 wt %, thereby preparing a paste. The paste was applied on a punching metal (serving as a current collector) and dried, thereby preparing a pasted hydrogen-absorbing alloy electrode (comparative electrode). An alkaline storage battery X1 was fabricated in the same manner as the alkaline storage batteries A1 through A14 except that this comparative electrode was used as a negative electrode.

Alkaline Storage Battery X2

The hydrogen-absorbing alloy powder (the same as that used in the alkaline storage batteries A1 through A14) and carbon black (manufactured by Mitsubishi Chemical Corporation; product code: MA-100) were mixed in a ratio by weight of 100:0.1. To the resultant mixture, a 0.5 wt % poly(ethylene oxide) aqueous solution serving as a binder was added in a ratio of 10 wt %, thereby preparing a paste. The paste was applied on a punching metal (serving as a current collector) and dried, thereby preparing a pasted hydrogen-absorbing alloy electrode (comparative electrode). An alkaline storage battery X2 was fabricated in the same manner as the alkaline storage batteries A1 through A14 except that this comparative electrode was used as a negative electrode.

Alkaline Storage Battery X3

The hydrogen-absorbing alloy powder (the same as that used in the alkaline storage batteries A1 through A14) and a mixture including graphite (KS-15) and yttrium hydroxide in a ratio by weight between graphite and the rare earth element of 95:5 were mixed in a ratio by weight of 100:0.1. To the resultant mixture, a 0.5 wt % poly(ethylene oxide) aqueous solution serving as a binder was added in a ratio of 10 wt %, thereby preparing a paste. The paste was applied on a punching metal (serving as a current collector) and dried, thereby preparing a pasted hydrogen-absorbing alloy electrode (comparative electrode). An alkaline storage battery X3 was fabricated in the same manner as the alkaline storage batteries A1 through A14 except that this comparative electrode was used as a negative electrode.

Alkaline Storage Battery X4

The hydrogen-absorbing alloy powder (the same as that used in the alkaline storage batteries A1 through A14) and a mixture including carbon black (MA-100) and yttrium hydroxide in a ratio by weight between carbon black and the rare earth element of 95:5 were mixed in a ratio by weight of 100:0.1. To the resultant mixture, a 0.5 wt % poly(ethylene oxide) aqueous solution serving as a binder was added in a ratio of 10 wt %, thereby preparing a paste. The paste was applied on a punching metal (serving as a current collector) and dried, thereby preparing a pasted hydrogen-absorbing alloy electrode (comparative electrode). An alkaline storage battery X4 was fabricated in the same manner as the alkaline storage batteries A1 through A14 except that this comparative electrode was used as a negative electrode.

Battery Tests

Each of the alkaline storage batteries A1 through A14 and X1 through X4 was charged/discharged with 100 mA three times and then subjected to the following battery tests (1) through (3). The results are shown in Table 1. The internal pressure was measured through a hole formed on the bottom of the battery can with a pressure gage attached to the bottom of the battery can of each battery.

(1) Internal Pressure Test:

Each battery was charged with 100 mA for 16 hours and discharged with 1000 mA down to a battery voltage of 1.0 V. Subsequently, the battery was charged with 1000 mA for 80 minutes, and the internal pressure (atm.) was measured at this point.

(2) Discharge Capacity Test:

Each battery was charged with 100 mA for 16 hours, discharged with 4000 mA down to a battery voltage of 1.0 V, and the discharge capacity (mAh) was obtained.

(3) Charge-Discharge Cycle Performance Test:

Each battery was subjected to a charge-discharge cycle test in each cycle of which the battery was charged with 1500 mA for 48 minutes, rested for 1 hour, discharged with 1500 mA down to a battery voltage of 1.0 V and rested for 1 hour. Thus, the number of charge-discharge cycles repeated until the discharge capacity became 800 mAh or lower was obtained.

TABLE 1

| Battery | Rare earth element (coating material) | Internal pressure (atm.) | Discharge capacity (mAh) | Charge-discharge cycles |
|---|---|---|---|---|
| A1 | Yttrium hydroxide | 4.9 | 940 | 640 |
| A2 | Lanthanum hydroxide | 5.3 | 940 | 601 |
| A3 | Cerium hydroxide | 5.3 | 930 | 665 |
| A4 | Praseodymium hydroxide | 5.8 | 930 | 640 |
| A5 | Neodymium hydroxide | 4.9 | 925 | 630 |
| A6 | Samarium hydroxide | 5.4 | 930 | 632 |
| A7 | Europium hydroxide | 5.9 | 925 | 679 |
| A8 | Gadolinium hydroxide | 5.4 | 930 | 630 |
| A9 | Terbium hydroxide | 5.4 | 930 | 637 |
| A10 | Dysprosium hydroxide | 5.8 | 940 | 625 |
| A11 | Holmium hydroxide | 5.8 | 940 | 631 |
| A12 | Erbium hydroxide | 5.0 | 950 | 682 |
| A13 | Ytterbium hydroxide | 5.8 | 950 | 639 |
| A14 | Lutetium hydroxide | 5.7 | 930 | 641 |
| X1 | No coating (graphite) | 8.5 | 850 | 334 |
| X2 | No coating (carbon black) | 9.0 | 840 | 322 |
| X3 | Mixture of graphite and yttrium hydroxide | 8.0 | 835 | 359 |
| X4 | Mixture of carbon black and yttrium hydroxide | 8.5 | 820 | 381 |

As is shown in Table 1, in the alkaline storage batteries A1 through A14 using the present electrodes, the increase of the internal pressure during charge is smaller, the discharge capacity in high rate discharge is larger and the charge-discharge cycle performance is better than in the alkaline storage batteries X1 through X4 using the comparative electrodes.

Experiment 2

Present electrodes and comparative electrodes were prepared so as to fabricate alkaline storage batteries using these electrodes, and the internal pressure characteristics during charge, the discharge capacity in high rate discharge and the charge-discharge cycle performance of the batteries were examined.

Alkaline Storage Batteries A1 through A28

Fourteen kinds of the composite particle powders prepared in the same manner as in Experiment 1 were heated at 250° C. for 3 hours in the air, thereby preparing fourteen kinds of powders. Each of the powders was analyzed by emission spectrochemical analysis, scanning electron microscopic analysis, electron probe microanalysis and X-ray diffraction analysis. As a result, each powder was found to be a composite particle powder with a rare earth element ratio R of 5 wt % in which the surfaces of the graphite particles were partially coated with an oxide of the rare earth element.

Alkaline storage batteries A15 through A28 were fabricated in the same manner as the alkaline storage batteries A1 through A14 except that these composite particle powders were respectively used.

Alkaline Storage Battery X5

The hydrogen-absorbing alloy powder (the same as that used in the alkaline storage batteries A1 through A14) and a mixture including graphite (KS-15) and yttrium oxide in a ratio by weight between graphite and the rare earth element of 95:5 were mixed in a ratio by weight of 100:0.1. To the resultant mixture, a 0.5 wt % poly(ethylene oxide) aqueous solution serving as a binder was added in a ratio of 10 wt %, thereby preparing a paste. The paste was applied on a punching metal (serving as a current collector) and dried, thereby preparing a pasted hydrogen-absorbing alloy electrode (comparative electrode). An alkaline storage battery X5 was fabricated in the same manner as the alkaline storage batteries A1 through A14 except that this comparative electrode was used as a negative electrode.

Alkaline Storage Battery X6

The hydrogen-absorbing alloy powder (the same as that used in the alkaline storage batteries A1 through A14) and a mixture including carbon black (MA-100) and yttrium oxide in a ratio by weight between carbon black and the rare earth element of 95:5 were mixed in a ratio by weight of 100:0.1. To the resultant mixture, a 0.5 wt % poly(ethylene oxide) aqueous solution serving as a binder was added in a ratio of 10 wt %, thereby preparing a paste. The paste was applied on a punching metal (serving as a current collector) and dried, thereby preparing a pasted hydrogen-absorbing alloy electrode (comparative electrode). An alkaline storage battery X6 was fabricated in the same manner as the alkaline storage batteries A1 through A14 except that this comparative electrode was used as a negative electrode.

Battery Tests

The alkaline storage batteries A15 through A28, X5 and X6 were subjected to the same battery tests as in Experiment 1. The results are shown in Table 2.

TABLE 2

| Battery | Rare earth element (coating material) | Internal pressure (atm.) | Discharge capacity (mAh) | Charge-discharge cycles |
| --- | --- | --- | --- | --- |
| A15 | Yttrium oxide | 4.7 | 940 | 650 |
| A16 | Lanthanum oxide | 5.1 | 940 | 605 |
| A17 | Cerium oxide | 5.2 | 935 | 672 |
| A18 | Praseodymium oxide | 5.7 | 930 | 642 |
| A19 | Neodymium oxide | 4.7 | 930 | 631 |
| A20 | Samarium oxide | 5.3 | 930 | 635 |
| A21 | Europium oxide | 5.8 | 930 | 681 |
| A22 | Gadolinium oxide | 5.3 | 935 | 633 |
| A23 | Terbium oxide | 5.2 | 935 | 635 |
| A24 | Dysprosium oxide | 5.7 | 945 | 630 |
| A25 | Holmium oxide | 5.6 | 945 | 632 |
| A26 | Erbium oxide | 4.8 | 960 | 685 |
| A27 | Ytterbium oxide | 5.6 | 950 | 642 |
| A28 | Lutetium oxide | 5.5 | 935 | 650 |
| X5 | Mixture of graphite and yttrium oxide | 8.4 | 830 | 351 |
| X6 | Mixture of carbon black and yttrium oxide | 8.6 | 815 | 385 |

As is shown in Table 2, in the alkaline storage batteries A15 through A28 using the present electrodes, the increase of the internal pressure during charge is smaller, the discharge capacity in high rate discharge is larger and the charge-discharge cycle performance is better than in the alkaline storage batteries X5 and X6 using the comparative electrodes.

Experiment 3

The relationship of the mixing ratio between the hydrogen-absorbing alloy powder and the composite particle powder with the internal pressure characteristic, the discharge capacity in high rate discharge and the charge-discharge cycle performance was examined.

Alkaline Storage Batteries B1 through B5

The hydrogen-absorbing alloy powder (the same as that used in the alkaline storage batteries A1 through A14) and the composite particle powder (the same as that used in the alkaline storage battery A1) were mixed in a ratio by weight between the hydrogen-absorbing alloy and graphite of 100:0.05, 100:0.5, 100:5, 100:10 or 100:12. To the resultant mixture, a 0.5 wt % poly(ethylene oxide) aqueous solution serving as a binder was added in a ratio of 10 wt %, thereby preparing a paste. The paste was applied on a punching metal (serving as a current collector) and dried. Thus, five kinds of pasted hydrogen-absorbing alloy electrodes (present electrodes) were prepared. Furthermore, a pasted hydrogen-absorbing alloy electrode (comparative electrode) was prepared in the same manner except that the composite particle powder was not included in the hydrogen-absorbing alloy powder.

Alkaline storage batteries B1 through B5 and Y were fabricated in the same manner as in Experiment 1 except that these six kinds of pasted hydrogen-absorbing alloy electrodes prepared as above were respectively used. Each of the thus fabricated batteries was subjected to the same battery tests as in Experiment 1. The results are shown in Table 3. Table 3 also shows the test results of the alkaline storage battery A1 listed in Table 1.

TABLE 3

| Battery | Weight ratio between hydrogen-absorbing alloy and carbon | Internal pressure (atm.) | Discharge capacity (mAh) | Charge-discharge cycles |
| --- | --- | --- | --- | --- |
| Y | — | 9.8 | 800 | 305 |
| B1 | 100:0.05 | 6.2 | 915 | 605 |
| A1 | 100:0.1 | 4.9 | 940 | 640 |
| B2 | 100:0.5 | 4.8 | 940 | 642 |
| B3 | 100:5 | 5.0 | 935 | 643 |
| B4 | 100:10 | 5.1 | 935 | 629 |
| B5 | 100:12 | 6.7 | 915 | 603 |

As is shown in Table 3, in the alkaline storage battery B1 in which the mixing ratio of the composite particle powder is so small that the ratio by weight between the hydrogen-absorbing alloy and graphite is smaller than 100:0.1, the effect to suppress the increase of the internal pressure during charge is small and the discharge capacity in high rate discharge is small. On the other hand, in the alkaline storage battery B5 in which the mixing ratio of the composite particle powder is so large that the ratio by weight between the hydrogen-absorbing alloy and graphite is larger than 100:10, the discharge capacity in high rate discharge is small. In the alkaline storage battery B5, the increase of the internal pressure during charge is large because hydrogen is generated on the negative electrode. On the basis of these results, it is understood that the mixing ratio between the hydrogen-absorbing alloy and graphite is preferably 100:0.1 through 100:10.

Experiment 4

The relationship of the composition of the hydrogen-absorbing alloy with the internal pressure characteristic during charge, the discharge capacity in high rate discharge and the charge-discharge cycle performance was examined.

Alkaline storage batteries C1 through C9 were fabricated in the same manner as the alkaline storage battery A1 except that hydrogen-absorbing alloy powders with compositions listed in Table 4 were respectively used as the hydrogen-absorbing alloy powders. Each of the batteries was subjected to the same battery tests as in Experiment 1. The results are shown in Table 4. Table 4 also shows the test results of the alkaline storage battery A1 listed in Table 1. In "x+y+z" shown in Table 4, x, y and z respectively correspond to composition ratios x, y and z in the composition formula of the hydrogen-absorbing alloy, $MmNi_xCo_yM_z$, wherein M is at least one element selected from the group consisting of Al, Mn, Fe, Cu and Mg.

prepared as above were respectively used as negative electrodes. Each of the batteries was subjected to the same battery tests as in Experiment 1. The results are shown in Table 5. Table 5 also shows the test results of the alkaline storage battery A1 listed in Table 1.

TABLE 4

| Battery | Alloy composition | x + y + z | Internal pressure (atm.) | Discharge capacity (mAh) | Charge-discharge cycles |
|---|---|---|---|---|---|
| A1 | $MmNi_{4.0}Co_{0.2}Al_{0.3}Mn_{0.5}$ | 5.0 | 4.9 | 940 | 640 |
| C1 | $MmNi_{3.8}Co_{0.4}Al_{0.3}Mn_{0.5}$ | 5.0 | 4.7 | 935 | 680 |
| C2 | $MmNi_{2.8}Co_{0.4}Al_{0.3}Mn_{0.5}$ | 4.0 | 4.7 | 940 | 627 |
| C3 | $MmNi_{3.3}Co_{0.4}Al_{0.3}Mn_{0.5}$ | 4.5 | 4.6 | 950 | 631 |
| C4 | $MmNi_{3.9}Co_{0.4}Al_{0.3}Mn_{0.5}$ | 5.1 | 4.7 | 960 | 780 |
| C5 | $MmNi_{4.2}Co_{0.4}Al_{0.3}Mn_{0.5}$ | 5.4 | 4.7 | 955 | 783 |
| C6 | $MmNi_{4.4}Co_{0.4}Al_{0.3}Mn_{0.5}$ | 5.6 | 5.2 | 940 | 785 |
| C7 | $MmNi_{3.7}Co_{0.4}Al_{0.3}Mn_{0.5}Fe_{0.1}$ | 5.0 | 5.1 | 950 | 780 |
| C8 | $MmNi_{3.7}Co_{0.4}Al_{0.3}Mn_{0.5}Cu_{0.1}$ | 5.0 | 5.2 | 950 | 778 |
| C9 | $MmNi_{3.7}Co_{0.4}Al_{0.3}Mn_{0.5}Mg_{0.1}$ | 5.0 | 5.1 | 945 | 776 |

It is understood from Table 4 that a hydrogen-absorbing alloy electrode according to the invention for an alkaline storage battery with small increase of the internal pressure during charge, large discharge capacity in high rate discharge and good charge-discharge cycle performance can be obtained regardless of the composition of the used hydrogen-absorbing alloy powder.

Experiment 5

The relationship of the particle shape of the hydrogen-absorbing alloy powder with the internal pressure characteristic during charge, the discharge capacity in high rate discharge and the charge-discharge cycle performance was examined.

An alloy material was melted by heating in an arc blast furnace in an argon atmosphere, and the melted alloy material was cooled by a gas atomizing method, thereby preparing a hydrogen-absorbing alloy powder including spherical or hen's egg-shaped particles having an average particle size of approximately 40 μm and represented by a composition formula $MmNi_{4.0}Co_{0.2}Al_{0.3}Mn_{0.5}$.

The hydrogen-absorbing alloy powder thus prepared by the gas atomizing method or a mixed powder including the hydrogen-absorbing alloy powder the same as that used in the alkaline storage batteries A1 through A14 and the hydrogen-absorbing alloy powder prepared by the gas atomizing method in a ratio by weight of 90:10, 80:20 or 50:50 was mixed with the composite particle powder the same as that used in the alkaline storage battery A1 in a ratio by weight between the hydrogen-absorbing alloy and graphite of 100:0.1. To the resultant mixture, a 0.5 wt % poly (ethylene oxide) aqueous solution serving as a binder was added in a ratio of 10 wt %, thereby preparing a paste. The paste was applied on a punching metal (current collector) and dried. Thus, four kinds of pasted hydrogen-absorbing alloy electrodes (present electrodes) were prepared.

Alkaline storage batteries D1 through D4 were fabricated in the same manner as in Experiment 1 except that the four kinds of the pasted hydrogen-absorbing alloy electrodes

TABLE 5

| Battery | Ratio of spherical or hen's egg-shaped alloy (wt %) | Internal pressure (atm.) | Discharge capacity (mAh) | Charge-discharge cycles |
|---|---|---|---|---|
| A1 | 0 | 4.9 | 940 | 640 |
| D1 | 10 | 4.7 | 945 | 645 |
| D2 | 20 | 4.7 | 945 | 653 |
| D3 | 50 | 4.5 | 940 | 670 |
| D4 | 100 | 4.1 | 935 | 685 |

As is shown in Table 5, in the alkaline storage batteries D1 through D4 using the hydrogen-absorbing alloy powders including 10 wt % or more of the spherical or hen's egg-shaped particles prepared by the gas atomizing method, the increase of the internal pressure during charge is smaller, the discharge capacity in high rate discharge is larger and the charge-discharge cycle performance is better than in the alkaline storage battery A1.

Experiment 6

The relationship of the content (coating amount) of the rare earth element in the composite particle powder with the internal pressure characteristic during charge, the discharge capacity in high rate discharge and the charge-discharge cycle performance was examined.

Composite particle powders respectively having yttrium ratios (rare earth element ratios) R of 1 wt %, 10 wt % and 15 wt % were prepared by changing the amount of yttrium oxide to be added to carbon. Alkaline storage batteries E1 through E3 were fabricated in the same manner as the alkaline storage battery A1 except that these composite particle powders were respectively used as the composite particle powders. Each battery was subjected to the same battery tests as in Experiment 1. The results are shown in Table 6. Table 6 also shows the test results of the alkaline storage battery A1 listed in Table 1.

TABLE 6

| Battery | Coating amount based on yttrium (wt %) | Internal pressure (atm.) | Discharge capacity (mAh) | Charge-discharge cycles |
|---|---|---|---|---|
| E1 | 1 | 5.0 | 945 | 630 |
| A1 | 5 | 4.9 | 940 | 640 |
| E2 | 10 | 5.0 | 935 | 640 |
| E3 | 15 | 5.2 | 920 | 630 |

It is understood from Table 6 that the composite particle powder preferably has an yttrium ratio R of 10 wt % or less. With respect to the other rare earth compounds, it was also confirmed that the rare earth element ratio R is preferably 10 wt % or less.

Obviously, numerous modifications and variations of the present invention are possible in light of the above teachings. It is therefore to be understood that within the scope of the appended claims the invention may be practiced otherwise than as specifically described herein.

What is claimed is:

1. A pasted hydrogen-absorbing alloy electrode for an alkaline storage battery comprising an active material layer formed on a current collector from a mixture including a hydrogen-absorbing alloy powder, a conductive agent and a binder, the conductive agent being a composite particle powder made from carbon particles and a rare earth compound partially coating surfaces of the carbon particles.

2. The pasted hydrogen-absorbing alloy electrode for an alkaline storage battery according to claim 1,
   wherein the hydrogen-absorbing alloy powder and the composite particle powder are mixed in a ratio by weight between a hydrogen-absorbing alloy and carbon of 100:0.1 through 100:10.

3. The pasted hydrogen-absorbing alloy electrode for an alkaline storage battery according to claim 1,
   wherein the hydrogen-absorbing alloy powder includes spherical or ellipsoid-shaped hydrogen-absorbing alloy particles prepared by an atomizing method in a ratio of 10 wt % or more.

4. The pasted hydrogen-absorbing alloy electrode for an alkaline storage battery according to claim 1,
   wherein the hydrogen-absorbing alloy powder is made from a hydrogen-absorbing alloy having a $CaCu_5$ crystal structure and represented by a composition formula, $MmNi_xCo_yM_z$, wherein Mm is a Mischmetal (a mixture of rare earth elements); M is at least one element selected from the group consisting of Al, Mg, Mn, Fe, Sn, Si, W, Zn, Cr and Cu; $2.8 \leq x \leq 4.4$; $0 \leq y \leq 0.6$; $0 \leq z \leq 1.5$; and $4.5 \leq x+y+z \leq 5.6$.

5. The pasted hydrogen-absorbing alloy electrode for an alkaline storage battery according to claim 1,
   wherein the rare earth compound is an oxide, a hydroxide or a fluoride of yttrium, lanthanum, cerium, praseodymium, neodymium, samarium, europium, gadolinium, terbium, dysprosium, holmium, erbium, ytterbium or lutetium.

6. The pasted hydrogen-absorbing alloy electrode for an alkaline storage battery according to claim 1,
   wherein the composite particle powder includes the rare earth compound in a rare earth element ratio R defined as follows of 10 wt % or less:

Rare earth element ratio $R$ (wt %)=Amount of rare earth element/(Amount of carbon+Amount of rare earth element)×100.

7. The pasted hydrogen-absorbing alloy electrode for an alkaline storage battery according to claim 1,
   wherein the carbon particles are made from graphite, coke, carbon black or acetylene black.

* * * * *